UNITED STATES PATENT OFFICE.

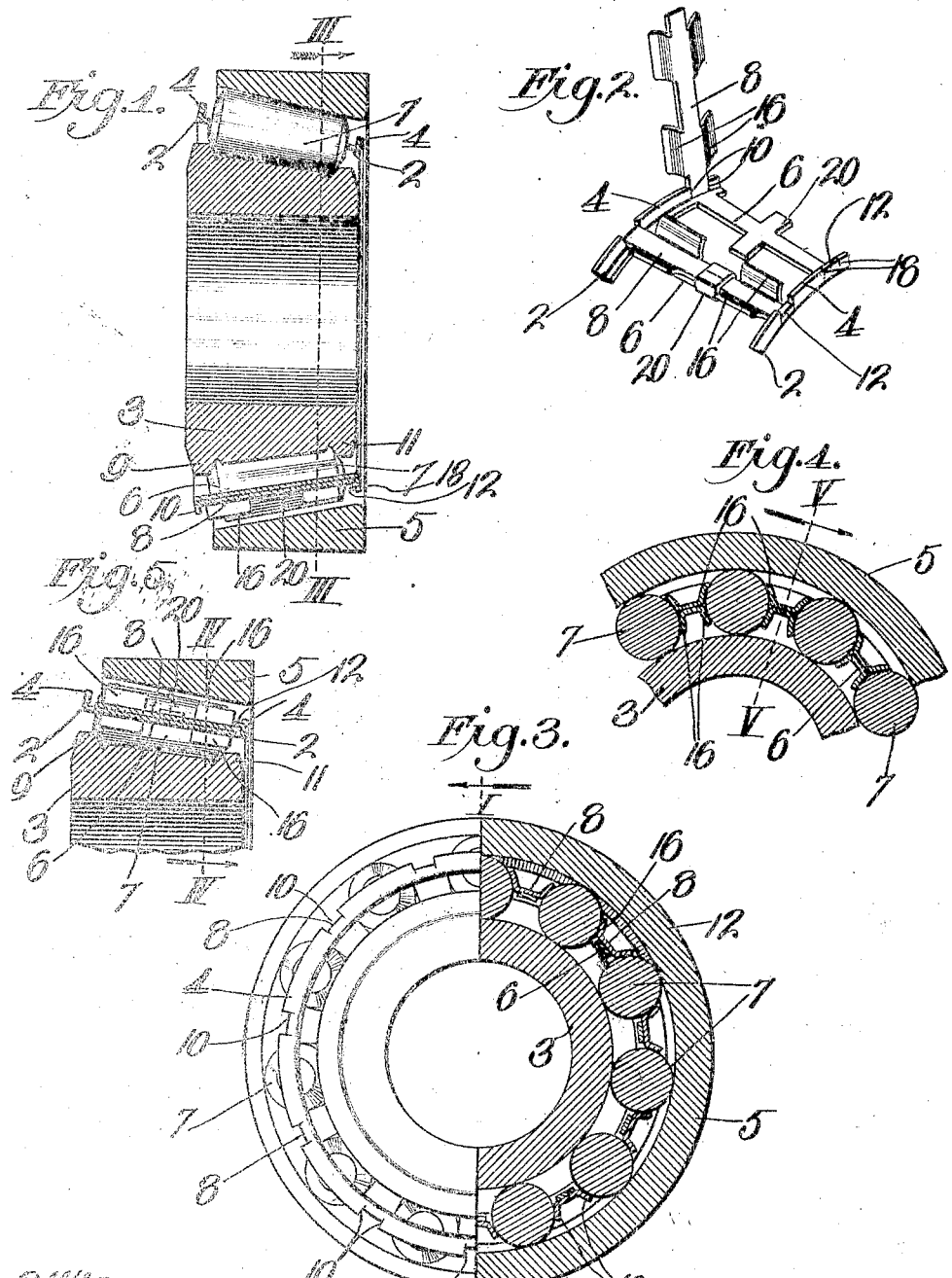

JOHN F. FOSTER, OF ARGENTINE, KANSAS.

ROLLER-BEARING CAGE.

1,100,179.  Specification of Letters Patent.  Patented June 16, 1914.

Application filed March 17, 1913. Serial No. 754,741.

*To all whom it may concern:*

Be it known that I, JOHN F. FOSTER, a citizen of the United States, residing at Argentine, in the county of Wyandotte and State of Kansas, have invented certain new and useful Improvements in Roller-Bearing Cages, of which the following is a specification.

This invention relates to improvements in cages for roller bearings, and one object of the same is to produce a cage which will admit of easy assembling of the rollers in place, and thereafter retain the same in position.

Another object is to provide a very simple construction adapted to be stamped cheaply from sheet material.

With these and other objects in view which will appear as the description proceeds, my invention consists in certain novel and peculiar features of construction as hereinafter described and claimed; and in order that the same may be fully understood reference is to be had to the accompanying drawings, in which—

Figure 1, is a vertical section through a roller bearing embodying my improved cage, the section being taken along the line I—I of Fig. 3. Fig. 2, is a perspective view of a portion of my cage. Fig. 3, is a side view, half in section along the line III—III of Fig. 1, of a complete roller bearing, and Figs. 4 and 5 are sectional views of a modified construction, taken along lines IV—IV and V—V respectively in said figures.

Referring to said drawing, the inner bearing for supporting the rollers 7 is in the form of a conical sleeve 3, while the outer bearing for the rollers is a collar 5, the inner surface of which is of the proper slope to conform to that of the adjacent contacting faces of the rollers.

My cage is for the purpose of holding the rollers in proper spaced relation between the bearings 5 and 7. The cage is stamped from sheet material to form two parallel portions of different length, which may be bent into annular form with the outwardly extending flanges 4. The annular portions 2 thus form rings of different diameters and are connected by a series of bars 6, and projecting from one of the rings 2 opposite each bar 6 is a similar bar 8, the flange 4 of which ring is slitted, as at 10, in order to allow bar 8 to be folded flat against bar 6. The opposite ring 2 is also slitted as at 18 at opposite sides of bar 6, in order that the lug 12 formed between the slits 18 may be folded over the free end of bar 8 and hold the latter in place. Said bar 8 is provided with one or more pairs of curved wings 16, extending from opposite sides of the bar, each set of wings between adjacent bars 8 forming a pocket in which to fit one of the rollers 7, as shown clearly in Figs. 3 and 4. I have illustrated each bar 8 as provided with two pairs of these wings 16, with lugs 20 on the adjacent bar 6, adapted to be folded around bar 8 between said pairs of wings whereby to securely clamp each pair of bars 6 and 8, together. It is obvious, however, that it would serve equally as well to equip the bars 8 with said lugs 20 as to locate them on bars 6; and, further, I may employ only one pair of wings to each bar 8, which wings may be located centrally or otherwise thereon, in which event I may rely on the lugs 12 alone to clamp the bars together. Again I may equip the inner bars 6 with one or more pairs of wings 16, as shown in Figs. 4 and 5, in which construction the cage will retain the rollers in place therein independently of any other means, since the rollers are supported against movement in any direction except about their axes.

In assembling the rollers, the cage may be held with its smaller ring 2 down, and the rollers inserted within the pockets, after which the sleeve 3, having the inner and outer ribs 9 and 11 may be placed within the cage, the wings 16 being sufficiently resilient to spread slightly to allow the passage of rib 11, then springing back when the sleeve is in position. The collar 5 may then be fitted over the rollers. The double wing construction of Figs. 4 and 5 has the advantage that it may be used with a sleeve having no inner rib 11, so that the sleeve may be the last part assembled, and can be removed at any time to get at the rollers, the latter being held in place by the wings of the bars 6.

It will be apparent that the outer cross bars 8 may be formed integral with either of the rings 2, or the same may be constructed of two sections to each bar, one extending from each ring and meeting, when folded, at some point along the bar 6.

Another important advantage to be noted in connection with the double bar construction lies in the fact that by merely removing the collar 5, any one of the bars 8, being resilient, may be sprung outward and the underlying rollers removed without disturbing the conical sleeve 3.

From the above it will be seen that I have produced a roller bearing cage of durable and simple construction, inexpensive to manufacture, and which may be modified in minor particulars without departing from the principle of construction as defined by the following claims.

I claim:

1. In a roller bearing cage, two rings integrally connected by a series of cross bars, a second series of cross bars formed integral with one of said rings, each cross bar of said second series being folded about its point of connection with said last-named ring and upon one of the cross bars of said first series, means formed upon the other of said rings and engaging the free end of each folded cross bar to secure the latter in its folded position, and pocket forming wings extending from one of said series of cross bars.

2. In a roller bearing cage, two rings connected by a series of cross bars, a second series of cross bars carried by one of said rings and folded upon the first series, means carried by each cross bar of one series for securing the corresponding cross bar of the other series thereto, and pocket-forming wings extending from the cross bars of one of said series.

3. In a roller bearing cage, two rings connected by a series of cross bars, a second series of cross bars carried by one of said rings and folded upon the first series, lugs carried by each cross bar of one series and folded around the corresponding cross bar of the other series, and pocket-forming wings extending from the cross bars of one of said series.

4. In a roller bearing cage, two rings connected by a series of cross bars, a second series of cross bars carried by one of said rings and folded upon the first series, means carried by the other of said rings and engaging the free end of each folded cross bar to secure the same to the corresponding bar of the other series, and pocket-forming wings extending from the cross bars of one of said series.

5. In a roller bearing cage, two rings connected by a series of cross bars, a second series of cross bars carried by one of said rings and folded upon the first series, means carried by each cross bar of one series for securing the corresponding cross bar of the other series thereto, and outwardly diverging wings carried by each cross bar of the folded series, the wings between each pair of adjacent wing carrying bars forming a pocket to receive a roller.

6. In a roller bearing cage, two rings connected by a series of cross bars, a second series of cross bars carried by one of said rings and folded upon the outer side of the first series, means for securing said series together, and one or more pairs of outwardly diverging pocket-forming wings carried by each cross bar of the outer series.

7. In a roller bearing cage, two rings connected by a series of cross bars, a second series of cross bars carried by one of said rings and folded upon the outer side of the first series, means for securing said series together, and one or more pairs of inwardly diverging pocket-forming wings carried by each cross bar of the inner series.

8. In a roller bearing cage, two rings connected by a series of cross bars, a second series of cross bars carried by one of said rings and folded upon the outer side of the first series, means for securing said series together, one or more pairs of inwardly diverging pocket forming wings carried by each cross bar of the inner series, and one or more pairs of outwardly diverging pocket-forming wings carried by each cross bar of the outer series.

In testimony whereof, I affix my signature, in the presence of two witnesses.

JOHN F. FOSTER.

Witnesses:
 HARRY LILLEY,
 G. Y. THORPE.